(12) United States Patent
Bird

(10) Patent No.: US 10,668,564 B2
(45) Date of Patent: Jun. 2, 2020

(54) LASER-BRAZED PCD ELEMENT

(71) Applicant: Halliburton Energy Services, Inc., Houston, TX (US)

(72) Inventor: Jay Stuart Bird, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 101 days.

(21) Appl. No.: 15/901,940

(22) Filed: Feb. 22, 2018

(65) Prior Publication Data
US 2018/0178324 A1    Jun. 28, 2018

Related U.S. Application Data

(62) Division of application No. 15/034,522, filed as application No. PCT/US2013/074422 on Dec. 11, 2013.

(51) Int. Cl.
| | |
|---|---|
| *B23K 26/20* | (2014.01) |
| *E21B 10/56* | (2006.01) |
| *E21B 10/567* | (2006.01) |
| *E21B 10/42* | (2006.01) |
| *E21B 10/54* | (2006.01) |

(52) U.S. Cl.
CPC ............ *B23K 26/20* (2013.01); *E21B 10/42* (2013.01); *E21B 10/54* (2013.01); *E21B 10/56* (2013.01); *E21B 10/567* (2013.01)

(58) Field of Classification Search
CPC .......... E21B 10/42; E21B 10/54; E21B 10/56; E21B 10/567; B23K 26/20
See application file for complete search history.

(56) References Cited

U.S. PATENT DOCUMENTS

| | | | |
|---|---|---|---|
| 7,389,834 B1 | 6/2008 | Kembaiyan | |
| 8,355,815 B2 | 1/2013 | Luce et al. | |
| 8,439,137 B1 | 5/2013 | Galloway | |
| 9,284,790 B2 * | 3/2016 | Zhang | E21B 10/56 |
| 2007/0151701 A1 | 7/2007 | Gordon et al. | |
| 2007/0235429 A1 | 10/2007 | Revel et al. | |
| 2010/0204824 A1 | 8/2010 | Luce | |

(Continued)

FOREIGN PATENT DOCUMENTS

| | | |
|---|---|---|
| EP | 1894658 A1 | 3/2008 |
| WO | 2011-107692 A1 | 9/2011 |

OTHER PUBLICATIONS

International Search Report and Written Opinion, Application No. PCT/US2013/074422, 16 pages, dated Sep. 12, 2014.

(Continued)

*Primary Examiner* — Omar Flores Sanchez
(74) *Attorney, Agent, or Firm* — Baker Botts L.L.P.

(57) ABSTRACT

The present disclosure relates to an industrial device, such as a drill bit that may be fabricated by performing a first coupling process that includes activating an attachment material between a first cutter element and a first recess of a bit body, monitoring a temperature associated with the first cutter element by a camera, and adjusting one or more parameters associated with the laser in response to output from the camera. The process may be repeated for a plurality of cutter elements. The disclosure further includes the process and a system to perform the process.

8 Claims, 3 Drawing Sheets

(56) References Cited

U.S. PATENT DOCUMENTS

| | | |
|---|---|---|
| 2010/0314176 A1 | 12/2010 | Zbang et al. |
| 2012/0090900 A1 | 4/2012 | Prajapati et al. |
| 2013/0197686 A1 | 8/2013 | Luce et al. |
| 2016/0002981 A1* | 1/2016 | Adia .................... E21B 10/567 |
| | | 175/428 |
| 2016/0097241 A1* | 4/2016 | Vaughn .................. E21B 10/36 |
| | | 175/39 |
| 2016/0229006 A1* | 8/2016 | Smith ................... E21B 10/567 |

OTHER PUBLICATIONS

"Perfect welds for car bodies," Research News, Published by Fraunhofer-Gesellscliaft, 14 pages (pp. 9-10), www.fraunhofer.de/presse, May 2011.

APA citation: "Laser welding as an engine of innovation," phys.org, 2 pages, http://phys.org/news/2013-04-laser-welding.html, Apr. 29, 2013.

\* cited by examiner

LASER-BRAZED PCD ELEMENT

RELATED APPLICATIONS

This application is a Divisional of U.S. application Ser. No. 15/034,522 filed May 4, 2016, which is a U.S. National Stage Application of International Application No. PCT/US2013/074422 filed Dec. 11, 2013, which designates the United States, and which are incorporated herein by reference in their entirety.

TECHNICAL FIELD

The current disclosure relates to a polycrystalline diamond (PCD) element, such as a cutter element, coupled to an industrial device, such as an earth-boring drill bit via an automated, monitored process of indirect heating.

BACKGROUND

Components of various industrial devices are often subjected to extreme conditions, such as high-temperatures and high-impact contact with hard and/or abrasive surfaces. For example, extreme temperatures and pressures are commonly encountered during earth drilling for oil extraction or mining purposes. Diamond, with its unsurpassed mechanical properties, can be the most effective material when properly used in a cutter element or abrasion-resistant contact element for use in earth drilling. Diamond is exceptionally hard, conducts heat away from the point of contact with the abrasive surface, and may provide other benefits in such conditions.

Diamond in a polycrystalline form has added toughness as compared to single-crystal diamond due to the random distribution of the diamond crystals, which avoids the particular planes of cleavage found in single-crystal diamond. Therefore, PCD is frequently the preferred form of diamond in many drilling applications. A drill bit cutter element that utilizes PCD is commonly referred to as a polycrystalline diamond cutter (PDC). Accordingly, a drill bit incorporating PCD cutter elements may be referred to as a PDC bit.

PCD cutter elements may be coupled to an industrial device such as an earth-boring drill bit by any number of processes. The overhead in managing the chosen coupling process—in terms of cost, manpower, etc.—increases the cost of operating an industrial device.

BRIEF DESCRIPTION OF THE DRAWINGS

A more complete understanding of the present embodiments and advantages thereof may be acquired by referring to the following description taken in conjunction with the accompanying drawings, which show particular embodiments of the current disclosure, in which like numbers refer to similar components, and in which.

DETAILED DESCRIPTION

Figure 1:
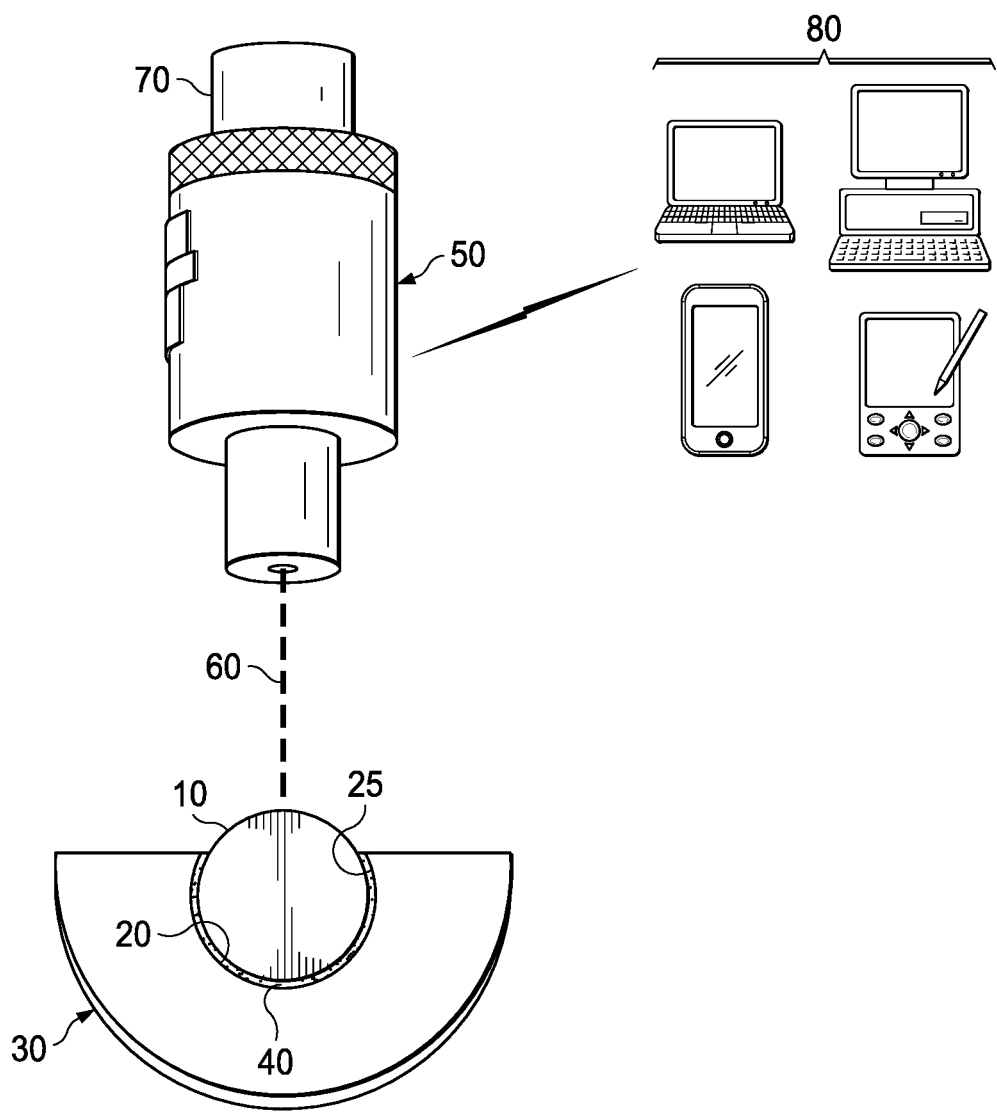
FIG. 1 is an end view of a first embodiment of a cutter element coupled to a bit body and associated devices used in a coupling process.

The present disclosure relates to a method of coupling a PCD element (including a thermally stable polycrystalline diamond (TSP) element), such as a cutter element, to a body (e.g., a bit body) of an industrial device, such as an earth-boring drill bit. It also relates to an industrial device, such as an earth-boring drill bit, containing a PCD element coupled in this fashion. The PCD element may be located in a recess or pocket of the drill bit. Merely placing the PCD element in the recess or pocket is not normally sufficient to retain the PCD element in the bit during operation. Accordingly, a brazing material, welding material, soldering material, adhesive, or other attachment material may be placed between the PCD element and the recess or pocket. It is often helpful for the attachment material to be applied at a particular temperature. Accordingly, the present disclosure includes methods, such as the use of an automated, monitored heating process, to establish or maintain an optimal or desired temperature of the attachment material between the PCD element and the recess or pocket, so that a brazing material, welding material, soldering material, adhesive, or other attachment material placed between the PCD element and the recess or pocket may be applied in an automated or substantially automated fashion.

More particularly, the present disclosure relates to an attachment joint between a PCD element and the recess or pocket fabricated in a manner such that a heat source is applied to a substrate portion of the PCD element, a portion of the recess or pocket, or both in order to activate the attachment material. An automated monitoring system (e.g., a thermal camera) may monitor the heating process in order to determine where the temperature of the attachment joint needs to raised or lowered. The automated monitoring system may additionally control the temperature or location of the heat source such that the temperature of the attachment joint is raised or lowered in appropriate locations.

Depending on the nature of the attachment material and the physical form in which it is provided, in some embodiments, it may be sufficient to merely heat the attachment material to establish a desired or optimal temperature. For example, if the attachment material is a metal foil placed substantially throughout the attachment joint prior to heating, it may be sufficient to simply heat the attachment material to a certain temperature at which it may couple to the PCD element and the body. In other embodiments, a desired or optimal temperature may be maintained for a selected time period. For example, if it is desirable for the attachment material to flow within the area between the PCD element and the pocket or recess, maintaining a temperature may be helpful.

The current disclosure further relates to a body of an industrial device configured to mechanically lock the PCD element, such as a cutter element, within the recess or pocket. The body may then be moved in such a fashion so as to present a second cutter element in a second recess or pocket to the automated (or substantially automated) heating and monitoring system. In such a manner, the attachment of a plurality of cutter elements to a body may be automated or substantially automated. For example, cutter elements and, optionally any attachment material may be pre-fitted in a plurality of pockets or recesses in an earth-boring drill bit prior to the coupling process. The mechanically locking features of the bit body may retain the cutter elements in place as the bit body is rotated to place each cutter element in position for the automated or substantially automated heating and monitoring system to raise the temperature of the cutter's attachment joint and thereby couple it to the drill bit. Alternatively, the mechanically locking features of the bit body may retain the cutter elements in place as the heating and monitoring system is rotated around the bit. In either embodiment, the bit body, cutter elements, and heating and monitoring system may further be positioned such that the attachment material remains sufficiently in the pocket or recess to actually couple the cutter element to the pocket or recess. For example, the components may be positioned such that an attachment material that becomes fluid or more able to flow like a fluid upon heating does not run out of the pocket or recess or pool in one portion of the pocket or recess such that coupling of the cutter element to the bit body is not achieved or is defective.

FIG. 1 illustrates an end view of a first embodiment of a cutter element 10 coupled to a recess or pocket 20 of a bit body 30 of an earth-boring drill bit. Cutter element 10 may be any appropriate cutter element. The bit body may, in some embodiments, comprise steel or a matrix mater.

Figure 2:
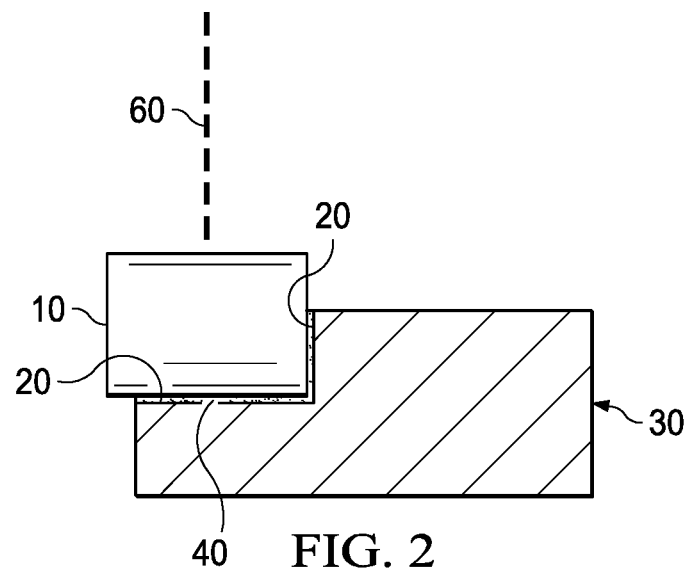
FIG. 2 is a cross-section view of a first embodiment of a cutter element coupled to a bit body.

Pocket 20 may be configured to mechanically lock cutter element 10 within a portion of bit body 30. For example, in the illustrated embodiment, pocket 20 is configured in a concave manner such that sidewalls 25 of pocket 20 curve around cutter element 10, holding cutter element 10 within a portion of bit body 30. Other configurations of pocket 20 may be implemented without departing from the scope of the present disclosure, as described below with reference to FIGS. 2-3.

Although pocket 20 may be configured to mechanically lock cutter element 10 within a portion of bit body 30, in some embodiments, pocket 20 may not be so configured. For example, in one implementation of the present disclosure, pocket 20 may be configured only to hold cutter element 10 in place within a portion of bit body 30 during the coupling process. Although this may reduce the degree of automation, such a configuration would be within the scope of the present disclosure.

Pocket 30 may also include attachment joint 40. Attachment joint 40 may be any appropriate joint, such as a braze joint. Attachment joint 40 may contain the attachment material in an activated, inactivated, or partially activated state. For example, attachment joint 40 may include a brazing material, such as a braze alloy, used to braze cutter element 10 to bit body 30. The attachment material may be in any suitable physical form, including paste, powder, foil, etc. In some configurations, such as those using a brazing material in paste form, the attachment material may be allowed to flow throughout attachment joint 40. In other configurations, such as those using a brazing material in foil form, the attachment material may already be in the desired location.

Heat is applied in order to activate the attachment material within attachment joint 40. In the illustrated embodiment of FIG. 1, automated monitoring system 50 applies heat to cutter element 10 by means of laser 60. Laser 60 may be automated or substantially automated to apply heat to a non-diamond portion (e.g., a substrate) of cutter element 10. This may be done very rapidly, for example through rapid movement of laser 60 or the contact point of its beam, which may facilitate an even temperature range in all or part of attachment joint 40. Laser 60 may apply heat directly to a non-diamond portion of cutter element 10, a portion of attachment joint 40, a portion of the attachment material, or a portion of bit body 30. Laser 60 may be any appropriate type of laser and may vary based on desired temperature, substrate material, bit body material, attachment material, etc.

During heating, the temperature of all or part of attachment joint 40, cutter element 10, the attachment material, or bit body 30 may be monitored by camera 70 of automated monitoring system 50. Camera 70 may be a thermal-imaging camera configured to generate temperature images and recognize the heat input that laser 60 is conducting on or near cutter element 10 or attachment join 40. Camera 70 may further be configured to determine the identity of attachment joint 40, the attachment material, cutter element 10, or bit body 30.

In some embodiments, output from camera 70 may be communicated to a display, which may be located or connected to a separate computing device 80, in order for an operator of automated monitoring system 50 to monitor the coupling process. In some embodiments, the coupling process may be more or less automated. For example, computer instructions stored on non-transitory computer-readable media may be implemented by a processor associated with automated monitoring system 50 to automatically monitor the coupling process and make any necessary adjustments to the intensity, location, heating pattern, or other variable associated with laser 60. The computer instructions may be further configured to allow a processor to automatically shut off laser 60 if a portion of attachment joint 40, cutter 10, or bit body 30 rises above a threshold temperature. The processor and computer-readable media may be located within automated monitoring system 50 or reside within a separate computing device 80 communicatively coupled to automated monitoring system 50.

In the same or alternative embodiments, it may be necessary or desirable to allow for human intervention in the automated coupling process. For example, a user may monitor the output of camera 70 at a display and manually adjust parameters of laser 60 such as intensity, location, heating pattern, etc. In the same or alternative embodiments, human interaction may only occur after all or portions of the coupling processes have been completed. For example, an operator may monitor the output of camera 70 at a display summarizing the results of one or more coupling processes. The operator may use this information, for example to determine if the coupling process occurred as specified, or if there may have been an error in the process, which might dictate removal of the cutter element and re-coupling.

A cross-section view of the embodiment described above is illustrated in FIG. 2. This view illustrates one embodiment of seating of cutter element 10 within pocket 20 of bit body 30. Laser 60 applies heat to a non-diamond (e.g., substrate) portion of cutter element 10 in order to activate the attachment material within attachment joint 40. In the illustrated embodiment, cutter element 10 is not locked within a portion of bit body 30 along this axis.

Figure 3:
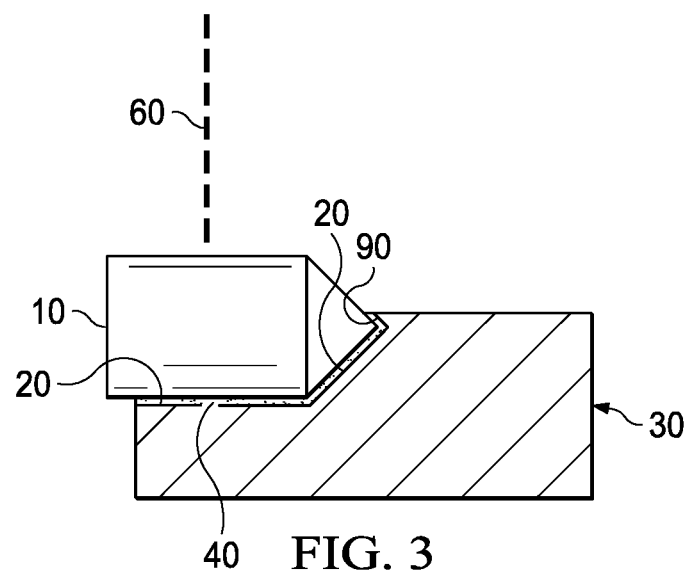
FIG. 3 is a cross-section view of a second embodiment of a cutter element coupled to a bit body.

In some embodiments, however, cutter element 10 may be locked within a portion of bit body 30 along this axis, as illustrated in FIG. 3. In this embodiment, pocket 20 of bit body 30 is configured in such a way as to lock cutter element 10 within a portion of bit body 30. For example, a locking portion 90 of pocket 20 extends over a portion of cutter element 10 in order to lock cutter element 10 within a portion of bit body 30.

Figure 4:
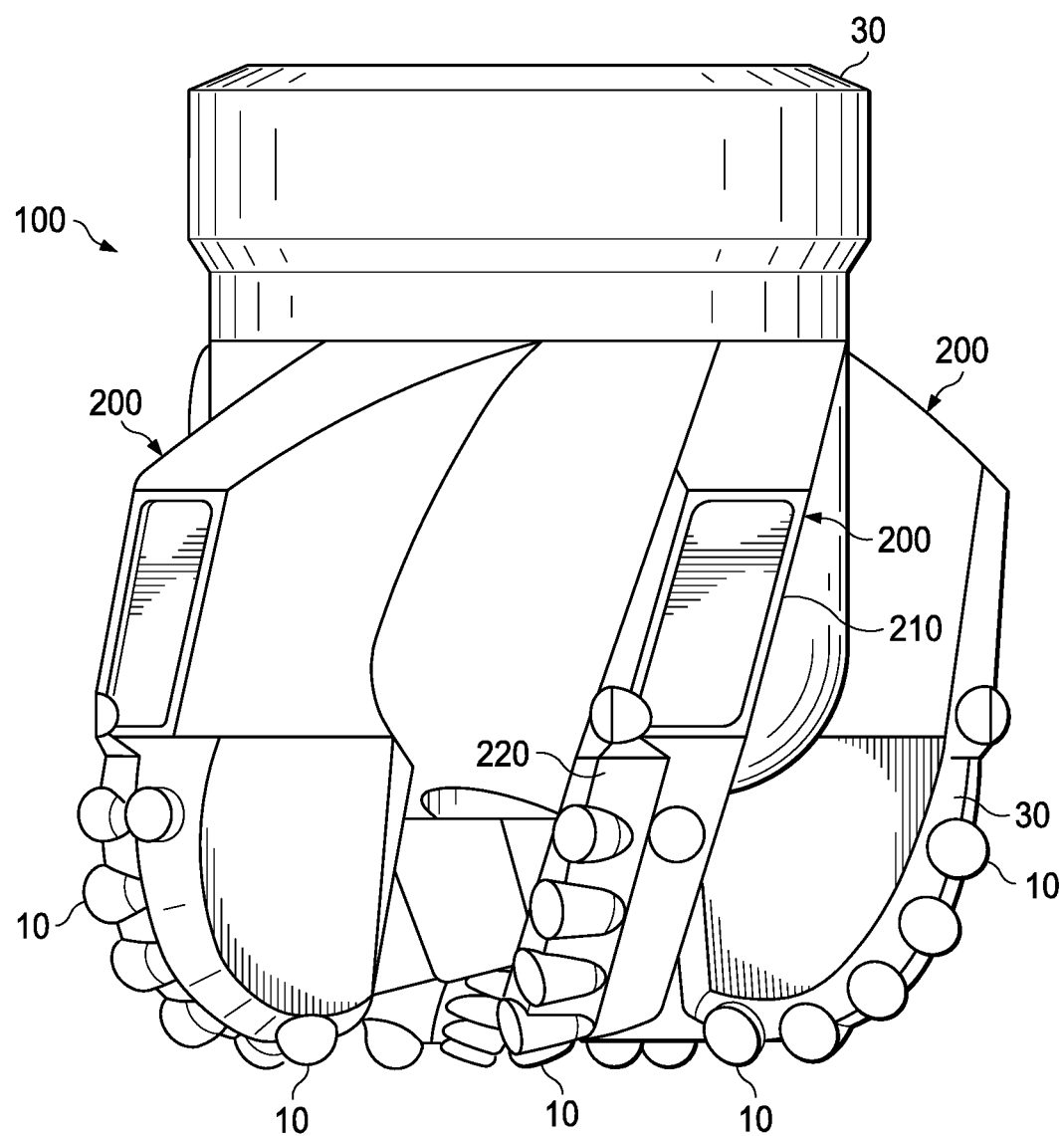
FIG. 4 is an earth-boring drill bit incorporating a bit body and multiple cutter elements.

Bit body 30 may be an earth-boring drill bit, such as a fixed cutter drill bit. FIG. 4 illustrates a fixed cutter drill bit 100 containing a plurality of cutter elements 10 coupled to bit body 30. Fixed cutter drill bit 100 may include bit body 30 with a plurality of blades 200 extending therefrom. Bit body 30 may be formed from steel, a matrix material, or other suitable bit body material. Bit body 30 maybe formed to have desired wear and erosion properties. Cutter elements 10 may be mounted on the bit using methods of this disclosure or using other methods.

For the embodiment shown in FIG. 4, fixed cutter drill bit 100 may have five (5) blades 200. For some applications the number of blades disposed on a fixed cutter drill bit incorporating teachings of the present disclosure may vary between three (3) and eight (8) blades or more. Respective junk slots 210 may be formed between adjacent blades 200. The number, size and configurations of blades 200 and junk slots 210 may be selected to optimize flow of drilling fluid, formation cutting and downhole debris from the bottom of a wellbore to an associated well surface.

Drilling action may occur as bit body 30 is rotated relative to the bottom (not expressly shown) of a wellbore in response to rotation of an associated drill string (not expressly shown). At least some cutter elements 10 disposed on associated blades 200 may contact adjacent portions of a downhole formation (not expressly shown) drilling. These cutter elements 10 may be oriented such that the PCD contacts the formation. The inside diameter of an associated wellbore may be generally defined by a combined outside diameter or gage diameter determined at least in part by respective gage portions 220 of blades 200.

In some embodiments, the fabrication of bit body 30 may include the attachment of a plurality of cutter elements 10 to bit body 30. This may include an automated (or substantially automated) process—such as that described in more detail above with reference to FIGS. 1-3—wherein a first coupling process is used to attach a first cutter element 10 to bit body 30, bit body 30 is rotated to expose a second cutter element 10 to automated monitoring system 50, and a second coupling process is used to attach the second cutter element 10 to bit body 30. This may repeat as many times as desired to attach a plurality of cutter elements 10 to bit body 30.

Although only exemplary embodiments of the invention are specifically described above, it will be appreciated that modifications and variations of these examples are possible without departing from the spirit and intended scope of the invention. For instance, the proper placement and orientation of PCD elements on other industrial devices may be determined by reference to the drill bit example. Additionally, the desired or optimal temperature for an attachment material in a coupling process may be a temperature range, such as between two temperatures or above a certain temperature. Additionally, other hard or ultrahard material elements, such as a cubic boron nitride element, or mixed diamond-silicon element may be used in the place of a PCD element as described herein.

The invention claimed is:

1. A method for fabricating a bit body, the method comprising:
    performing a first coupling process, the first coupling process comprising:
        heating an attachment material located along at least a portion of an attachment joint between a first cutter element and a first recess of a bit body, wherein heating comprises applying a substantially automated heat source comprising a laser;
        monitoring a temperature of at least one of the first cutter element, the bit body, the attachment joint, and the attachment material using a camera; and
        adjusting at least one parameter associated with the laser in response to at least one output from the camera related to the monitored temperature.

2. The method of claim 1, wherein the one or more parameters associated with the laser comprise the intensity of the laser.

3. The method of claim 1, wherein the one or more parameters associated with the laser comprise the location of the laser.

4. The method of claim 1, wherein the one or more parameters associated with the laser comprise the heating pattern of the laser.

5. The method of claim 1, further comprising:
    rotating the bit body to expose a second cutter element to the substantially automated heat source, the second cutter element located within a second recess of the bit body; and
    performing a second coupling process, wherein the second coupling process is substantially similar to the first coupling process.

6. The method of claim 1, wherein the first recess is configured to mechanically lock the first cutter element within the recess.

7. The method of claim 1, wherein the first recess is configured to mechanically lock the first cutter element along an axis tangential to the surface of the bit body.

8. The method of claim 1, wherein the first recess is configured to mechanically lock the first cutter element along an axis perpendicular to the surface of the bit body.

* * * * *